May 30, 1939.  A. R. COOPER  2,160,259
POWER ATTACHMENT FOR LAWN MOWERS
Filed May 14, 1937  2 Sheets-Sheet 2
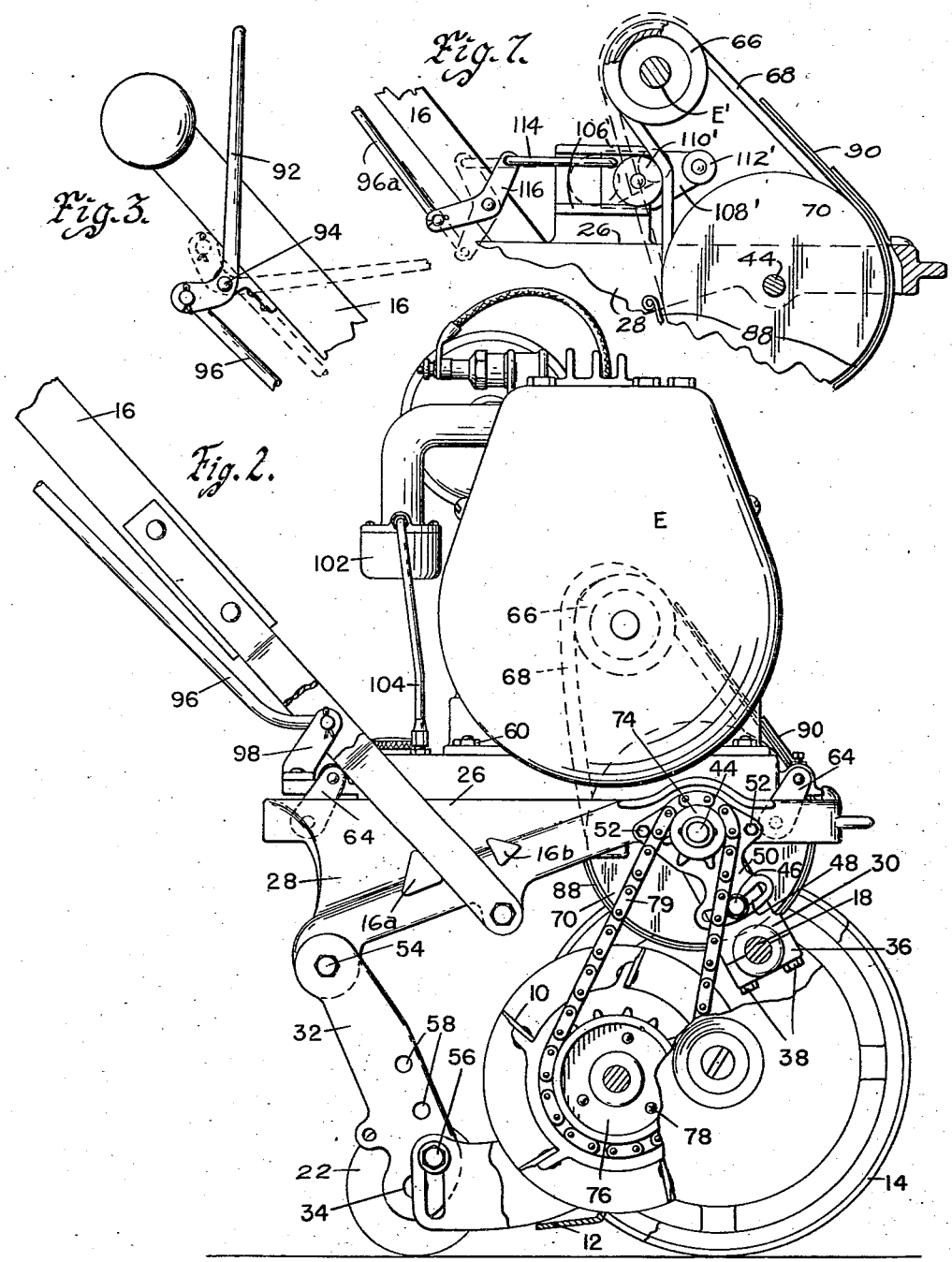
Inventor
Allyn R. Cooper
by Baird & Freeman
Attorneys
Witness
H. S. Munzenmaier Patented May 30, 1939

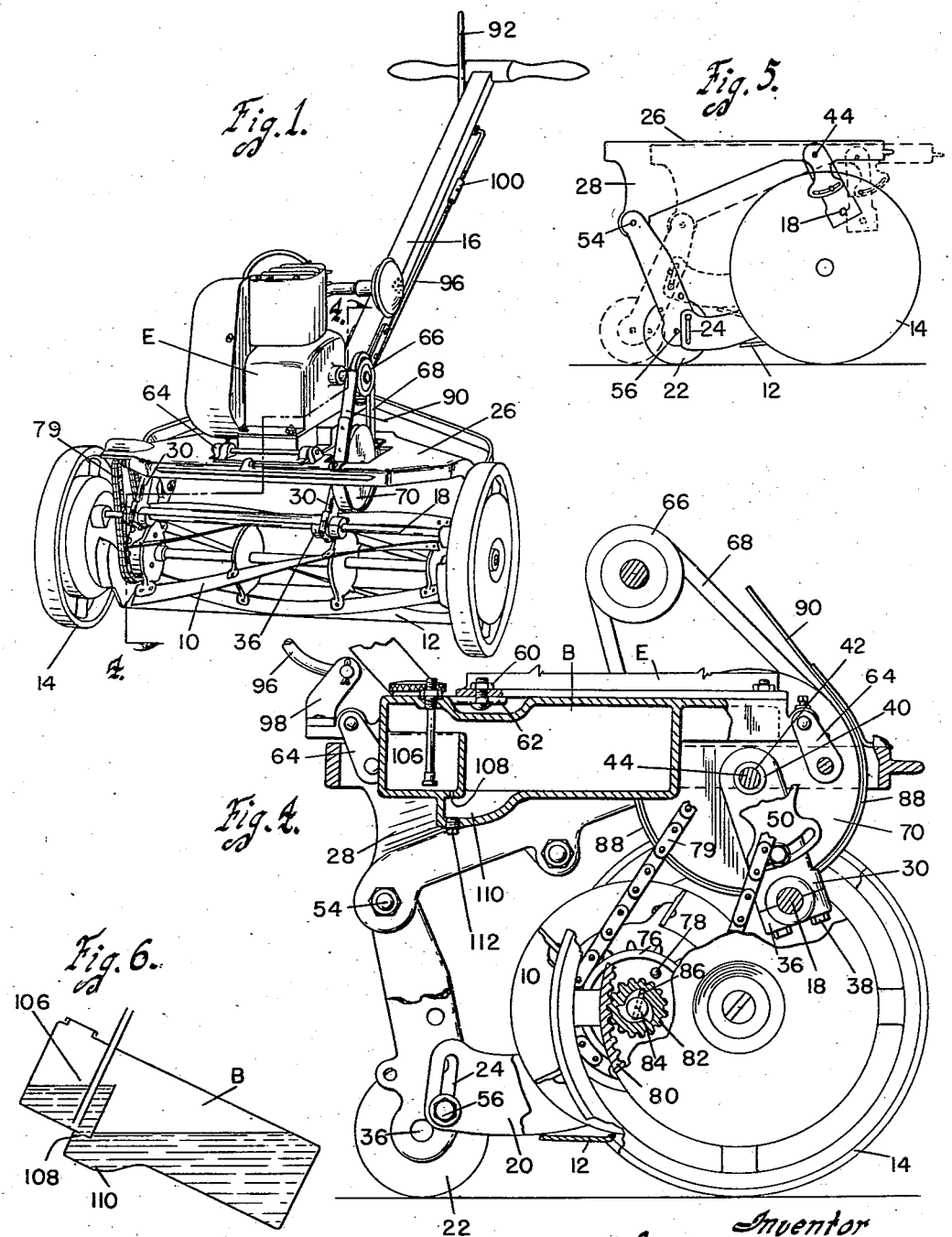

2,160,259

UNITED STATES PATENT OFFICE 2,160,259

POWER ATTACHMENT FOR LAWN MOWERS

Allyn R. Cooper, Marshalltown, Iowa

Application May 14, 1937, Serial No. 142,646

15 Claims. (Cl. 56—26)

An object of my invention is to provide a simple, durable and inexpensive power attachment for lawn mowers of standard construction.

A further object is to provide an attachment which can be readily mounted on a standard lawn mower in such manner that the engine of the power attachment can be maintained substantially level in all positions of adjustment of the cutting blade of the lawn mower.

Still a further object is to provide a simple power attachment so designed that the necessity of providing a clutch is eliminated, operation and discontinuance of operation of the mower reel being effected through a belt which can be tightened or loosened as desired by shifting the position of the engine.

Still a further object is to provide means for shifting the position of the engine without tipping it to a non-level position.

Still another object is to provide a fuel tank in the base of the engine which is so constructed that fuel is available for the engine even when the fuel tank is in a steeply tipped position.

Still another object is to provide a modified construction in which a slidably mounted member carries a pair of pulleys for engagement with one run of a belt of the attachment for tightening or loosening this belt instead of shifting the position of the engine to connect or disconnect the engine operatively relative to the mower mechanism.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of my power attachment applied to a lawn mower.

Figure 2 is a side elevation of the same on an enlarged scale, parts thereof being broken away to show the construction, and a portion of the lawn mower handle being omitted.

Figure 3 is a side elevation of the omitted portion of the lawn mower handle showing a control lever mounted thereon.

Figure 4 is an enlarged sectional view on the line 4—4 of Figure 1, and shows the parts in a different adjusted position relative to the position shown in Figure 2.

Figure 5 is a diagrammatic view showing a parallelogram action which takes place during adjustment of the cutting blade of the mower relative to the ground surface.

Figure 6 is a diagrammatic view of the fuel tank in the base of the engine showing its action when the lawn mower travels down hill; and Figure 7 is a sectional view somewhat similar to Figure 4 showing a modified construction in which a means is provided to tighten or loosen the belt without shifting the engine.

On the accompanying drawings, I show a standard lawn mower having in general a mower reel 10, a cutting blade 12 cooperating therewith, traction wheels 14 and an operating handle 16. Lawn mowers of this character are usually provided with a cross rod 18 forming part of the stationary frame of the mower, and also have rearwardly extending arms 20 on which the trailer roller 22 is adjustably mounted, these arms being slotted as at 24 for this purpose.

My power attachment includes a relatively flat engine frame 26 on which is mounted the engine E. The frame 26 has downwardly extending triangularly shaped sides 28.

For mounting the frame 26 on the frame of the mower I provide at the front a pair of arms 30 clamped to the rod 18 and a pair of arms 32 at the rear, which are provided with perforations 34 for the shaft 36 of the trailer roller 22. The arms 30 are clamped in position by clamp caps 36 retained in position by clamp screws 38. This construction serves to normally prevent rotation of the arms 30 about the rod 18.

The upper ends of the arms 30 are perforated as at 40 in Figure 4 to receive bearings 42 carried by the engine frame 26. The bearings 42 are provided for a jack shaft 44, and the arms 30 are rotatable about the bearings, while adjustments are being made as will hereinafter be described. Relative rotation of the arms 30 and the frame 26 is normally prevented, however, by a clamp screw 46 extending through an arcuate slot 48 of a plate 50 and into the arms 30. Two of the plates 50 are provided, one for each arm 30 and they are rigid relative to the frame 26, being mounted thereon by cap screws or the like 52 (see Figure 2). The upper ends of the arms 32 are bolted as at 54 to the sides 28 of the frame 26, while the lower ends thereof receive clamp screws 56 which extend through the adjusting slots 24 of the arms 20 of the mower. Additional threaded perforations indicated at 58 are provided for other adjustments as illustrated in Figure 5, where in dotted lines the clamp screw 56 is cooperating with the upper perforation 58.

The engine E is mounted on a hollow base B which serves the purpose of a fuel tank. Bolts 60 cooperate with slots 62 of the base so that the engine and base can be relatively adjusted for belt tightening purposes.

The base B is supported by parallelogram links 64, two of which are provided at the front and two at the rear of the base. The upper ends of these links are pivoted to the base while the lower ends are pivoted to the frame 26.

The engine is provided with a drive pulley 66 with which a V-belt 68 cooperates. This belt extends around a jack shaft pulley 70 for driving the jack shaft 44. The jack shaft in turn drives the reel 10 through a chain 79 which meshes with a small sprocket 74 on the jack shaft and a larger one 76 secured to the end spider of the reel 10 as by rivets or the like 78.

In Figure 4, I show the internal gear 80 of the traction wheel 14 with which a ratchet pinion 82 meshes. The shaft 84 of the mower reel 10 has a sliding pin type of pawl 86 coacting with the internal ratchet teeth of the ratchet pinion 82. This is the usual construction although I disassemble the mower to the extent of removing the pinions 82 and interchanging them so that the reel 10 being driven will drive the traction wheels 14, thus utilizing the power of the engine E for propelling the mower as well as the mower reel 10.

Due to the engine E being movable relative to the engine frame 26, by reason of the parallelogram link mounting at 64, obviously the belt 68 can be tightened or loosened by moving the engine rearwardly as in Figure 4, or forwardly as in Figure 2, respectively.

In moving the engine forwardly as in Figure 2, the portion of the belt 68 extending under the jack shaft pulley 70 is retained in engagement with the pulley by a semicircular guard 88, the forward end of the guard 88 terminating in an upwardly and rearwardly sloping portion 90, which retains the upper stretch of the belt against its normal tendency to bow outwardly and accordingly pushes the portion thereof extending over the drive pulley 66 away from the drive pulley, as shown by dotted lines in Figure 2. This eliminates the necessity of providing a clutch, as the mower reel and mower can be operatively disconnected from the engine while the engine is still running by the means just described.

For the purpose of shifting the engine forwardly and rearwardly for non-driving and driving connection of the engine to the mower respectively, I provide a control lever 92 pivoted at 94 on the handle 16 adjacent the upper end thereof where it is convenient for the operator to manipulate. The lever 92 is connected by a link 96 to a bracket 98 on the frame 26, and the link includes a turnbuckle connection 100. The lever 92 can be swung forwardly to an overcenter position as shown by dotted lines in Figure 3, for moving the engine rearwardly to tighten the belt, as in Figure 4, the degree of tightness being somewhat adjustable by the turnbuckle 100.

A further and rough adjustment is secured by the bolts 60 and cooperating slots 62.

By the parallelogram link arrangement at 64, the engine E is kept level in any position to which it is shifted relative to the engine frame 26. This is particularly desirable where a gasoline engine is used, as greatest efficiency is secured by keeping it in a level position.

The arrangement described for mounting the frame 26 by the arms 30 and 32 also maintains the frame level in all positions of adjustment of the cutter bar 12.

When it is desirable to adjust the height of this bar, the bolts 46, 54 and 56 are loosened, whereupon the parts may be adjusted either as shown comparatively in Figures 2 and 4, or as shown by full and dotted lines in Figure 5, wherein the extreme adjustments are illustrated.

A parallelogram action is set up with the axis of the traction wheels 14, the jack shaft 44, the clamp bolt 54 and the clamp bolt 56 as the pivotal points, which as illustrated keeps the frame 26 substantially level.

During the adjustment of the rearward extending arms 20 which are pivotally mounted upon the jack shaft 44, the engine frame and the mower frame shift from the full line position of Figure 5 to the dotted line position wherein the slot 24 is changed from bolted location 56 to a bolted location at one of the points 58 higher up on the rear arms 32. This shift causes a relative movement of the engine frame 26 forward, changing the relative angular positions between the plate 50 and the arm 30. In making the adjustment the entire mower mechanism is shifted a few degrees about the jack shaft 44 as a center, thereby elevating the plate 12 to a position further from the ground and also elevating the axis 84 of the cutter reel 10, since that is also carried by the rearward extending arms 20. The relative distances, however, between pivot points remains the same and for this reason there is no loosening of the chain 79 or the belt 68.

After the parts have been adjusted, the clamp bolts 46, 54 and 56 are again tightened. In case it is desirable to tighten the chain 79, this can be accomplished by loosening the clamp bolts 38, 46, 54 and 56 and swinging the arms 30 about the rod 18, after which the bolts can be retightened.

At 102, I illustrate the carburetor of the engine E. A fuel line 104 extends therefrom into the base B adjacent one side of the fuel tank therein. When traveling up hill, when the fuel level is low, there would be sufficient fuel to cover the intake end of the fuel line 104. When traveling down hill, however, due to the fuel line being adjacent the back of the base B, the engine might run out of fuel.

I provide against this contingency by forming in the base B a compartment 106 surrounding the intake end of the fuel line 104. A vent 108 communicates this compartment with the remaining interior of the base, a sump 110 being provided adjacent the vent. A clean-out plug 112 is provided for the sump 110.

When traveling down hill, the quantity of fuel in the compartment 106 which splashes thereinto as the machine travels over the ground, and also flows thereinto through the vent 108, will completely cover the intake end of the fuel line 104. It will, of course, slowly flow out of the compartment 106, but usually the down hill travel is of less duration than the time it takes for the fuel to drain out of the compartment. Accordingly there is always a supply of fuel for the engine whether traveling up hill or down.

It is obvious that my power attachment has been designed for simplicity, both in manufacture and operation. The complications of providing a clutch mechanism are entirely eliminated with my means for tightening and loosening the belt 68 to serve the purpose of a clutch. Means has been provided for maintaining the engine level with respect to the mower in all positions of adjustment and operation. As a result of such design the attachment can be inexpensively manufactured, yet the device has all the advantages required for power operation of a lawn mower.

The frame sides 28 are preferably provided with stops 16a and 16b, as shown in Figure 2, the stops 16a serving to limit the backward and forward swinging movement of the handle 16. The stops 16a also serve the purpose of permitting the traction wheels 14 to be tipped upwardly about the roller 22, as a pivot, when turning a corner, so that the engine does not continue to pull the mower during this period of time. This eliminates the necessity of having to manipulate the control 92 and provides a very convenient means for preventing movement of the mower as result of operation of the engine when desired for any reason.

In Figure 7, the shaft E' of the engine is stationary relative to the engine frame 26. In other words, the engine is mounted directly on the frame 26 without being shiftable relative thereto. Means is provided in this form of the invention for operating the mower or stopping operation thereof, comprising a guide member 106' in which is slidably mounted a member 108' carrying a pair of pulleys 110' and 112'. The member 108' is connected by a link 114 to a bell crank 116 which in turn is operated by the rod 96a extending up to the operating handle 92, the same as in Figure 3.

When the parts are in the full line position shown, the pulley 110' against the back of the belt 68 keeps the belt sufficiently tight to rotate the power shaft pulley 70 from the engine pulley 66.

When the member 108' is slid to the dotted position, the pulley 110' is released from the belt 68, and the belt is then unbowed to a substantially straight position, as shown by dotted lines, by the pulley 112'. This releases the upper portion of the bolt from the pulley 66 as shown by dotted lines, the guard 88 retaining the belt against the pulley 70.

With this construction the belt can be tightened or loosened as desired without shifting the engine.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a power attachment for lawn mowers, an engine frame for attachment to the frame of a lawn mower, a pulley carried thereby and operatively connected with the mower mechanism of said lawn mower, an engine swingably mounted on said engine frame and belted to said pulley, parallelogram links for connecting said engine to said engine frame to permit movement of the engine relative to the engine frame and maintain the engine level when the relative elevation is changed, a manual control for moving said engine relative to said engine frame including a lever mounted on one part and engaging the other for tightening or loosening said belt to operate said mower mechanism to stop the operation thereof respectively.

2. In a power attachment for lawn mowers, an engine frame for attachment to the frame of a lawn mower, a pulley carried thereby and operatively connected with the mower mechanism of said lawn mower, an engine mounted on said engine frame and belted to said pulley, parallelogram links for connecting said engine to said engine frame to permit movement of the engine relative to the engine frame and maintain the engine level, and a manual control including a lever secured to one part and engaging the other for moving said engine relative to said engine frame for tightening or loosening said belt to operate said mower mechanism or stop the operation thereof respectively, said manual control including a control lever pivoted to the handle of said lawn mower and movable to an over-center position for retaining said engine in position with said belt tight.

3. In a power attachment for lawn mowers, an engine frame for attachment to the frame of a lawn mower, a pulley carried thereby and operatively connected with the mower mechanism of said lawn mower, an engine mounted on said engine frame and belted to said pulley, parallelogram links for connecting said engine to said engine frame to permit lifting the engine a limited distance from one position on the engine frame to another and maintain the engine level throughout said lifting, a manual control for moving said engine relative to said engine frame including a lever engaging the engine and the frame for tightening or loosening said belt to operate said mower mechanism or stop the operation thereof respectively and a link for operatively connecting said lever with said engine, said link being variable in length to adjust the tension of the belt in its tight position.

4. In a power attachment for lawn mowers, an engine frame for attachment to the frame of a lawn mower, a driven pulley carried by said frame and operatively connected with the reel of said lawn mower, an engine mounted on said engine frame and having a drive pulley, a belt for belting said drive pulley to said driven pulley, a guard around and closely following the part of said driven pulley around which said belt extends, said guard having an extension arranged to prevent the stretch of said belt from bowing outwardly when said belt is loosened, and means for moving said belt for tightening or releasing said belt to operate said reel or stop it respectively, said means comprising a movable carrier member on a stationary portion of the device and a projection carried thereby and positioned adjacent one run of said belt to bow the belt to taut position.

5. In a power attachment for lawn mowers, an engine frame for attachment to the frame of a lawn mower, a driven pulley carried by said frame and operatively connected with the reel of said lawn mower, an engine mounted on said engine frame and having a drive pulley, a belt for belting said drive pulley to said driven pulley, a guard around and closely following the part of said driven pulley around which said belt extends, said guard having an extension arranged to prevent the stretch of said belt from bowing outwardly when said belt is loosened, a guide member on a stationary portion of the device, a carrier member slidably mounted on the guide member and a pulley carried thereby adapted to be shifted with said carrier into contact with the belt to bow the belt to taut position.

6. In a power attachment for lawn mowers, an engine frame, a mower frame, traction wheels and a trailer roller on the mower frame and means for mounting said engine frame on said mower frame, said means comprising two pairs of arms, one pair being fixed to said mower frame and having the forward end of the engine frame pivoted thereto, the other pair having the rear end of the engine frame pivoted thereto and being provided with a shiftable connection to said mower frame, said other pair of arms carrying said trailer roller, a cutting blade adjustable with the body by a shift in the pivotal connections and means for clamping the pivotal connections against pivotal movement after adjustment of the cutting blade of the mower has been effected.

7. In a power attachment for lawn mowers, an engine frame and a lawn mower frame, traction wheels and a trailer roller on said mower frame and means for mounting the engine frame on the mower frame, said means comprising two pairs of arms, one pair being fixed to said mower frame and having the forward end of the engine frame pivoted thereto, the other pair having the rear end of the engine frame pivoted thereto and having an adjustable connection to said mower frame, said other pair of arms carrying said trailer roller, a cutting blade on the frame adjustable as to height and clamping means for securing the pivotal connections against pivotal movement after adjustment of the height of the cutting blade of the mower has been effected, said last means including a pair of plates having arcuate slots and clamping bolts cooperating with said slots, said plates and bolts providing a fixed connection between said engine frame and one pair of said arms.

8. In a power attachment for lawn mowers, an engine frame, a lawn mower frame, traction wheels and a trailer on said mower frame and means for mounting the engine frame on the mower frame comprising two pairs of arms, one pair being fixed to said mower frame and having the forward end provided with a pivoted connection with the engine frame, the other pair having a pivoted connection with the rear end of the engine frame and having an adjustable connection to said mower frame, said other pair of arms carrying a journalled connection for said trailer roller, a cutting blade on the frame adjustable as to height and means for clamping the movable parts to prevent pivotal movement after adjustment of the height of the cutting blade of the mower has been effected, one pair of said arms being swingable relative to said mower frame and means for clamping said pair in rigid position.

9. In a power attachment for lawn mowers, an engine frame, a lawn mower frame, traction wheels and a trailer roller on said mower frame and means for mounting the engine frame on the mower frame comprising two pairs of arms, one pair being fixed to said mower frame and having a pivotal connection with the forward end of the engine frame, the other pair having a pivotal connection with the rear end of the engine frame and an adjustable connection to said mower frame, said other pair of arms carrying said trailer roller journalled thereon, an adjustable cutting blade on the mower frame and clamping means for securing the pivotal connections against pivotal movement after adjustment of the height of the cutting blade of the mower has been effected, said last means including a pair of plates having arcuate slots and clamping bolts cooperating with said slots, said plates and bolts providing a fixed connection between said engine frame and one pair of said arms, one pair of said arms being swingable relative to said mower frame and means for clamping said pair in rigid position.

10. In a power attachment for lawn mowers, an engine frame, a lawn mower frame, traction wheels and a trailer roller on said mower frame and means for mounting the engine frame on the mower frame comprising two pairs of arms, one pair being fixed to the mower frame and having the forward end of the engine frame pivoted thereto, and the other pair having the rear of the engine frame pivoted thereto and being adjustable relative to said mower frame, said other pair of arms carrying said trailer roller journalled thereon, an adjustable cutting blade on the mower, and clamping means for securing the movable parts of the device in fixed relation after adjustment of the height of the cutting blade of the mower has been effected, a chain connection between an engine mounted on said engine frame and the mower mechanism, one pair of said arms being swingable relative to said mower frame for effecting tightening or loosening of said chain connection.

11. In a power attachment for lawn mowers an engine frame for attachment to the frame of the lawn mower, a pulley carried thereby and operatively connected with the reel of said lawn mower, an engine having a pulley thereon belted to the first pulley, and means for swingably securing the engine on said engine frame including a system of pivoted links attached to the engine and the frame adapted to permit a change in the relative horizontal positions between them, and manually operable means for effecting said shift in the relative positions whereby to change the distance between said pulleys for tightening or loosening the belt to operate said reel or stop the operation thereof.

12. In a power attachment for lawn mowers an engine frame for attachment to the frame of a lawn mower, a pulley carried thereby and operatively connected with the mower mechanism, an engine having a drive pulley belted to said pulley, means for moving said engine relative to said engine frame, comprising a system of pivoted links attached to the engine and the frame to permit a limited horizontal movement between them and the attached pulleys to operate said motor mechanism or to stop the operation thereof.

13. In a power attachment for lawn mowers, an engine frame, means for mounting said engine frame on the frame of a lawn mower whereby the lawn mower may be adjusted to vary the height of the cut without tipping said engine frame comprising pivotal connections for securing said engine frame to said lawn mower, one of said connections being a pair of members of fixed length secured at each side to the engine frame and the mower frame at a position above the axis of the traction wheels and the other of said connections being another pair of members of fixed length secured at each side to the engine frame and mower frame at substantially an equivalent distance above the axis of a trailer roller forming opposite legs of a parallelogram, a pair of rearward extending members pivoted about the axis of the traction wheels and bearing a cutting reel adapted to be secured at different locations with respect to the sides of the parallelogram, a cutting blade carried by said members adapted thereby to have its elevation changed with respect to the ground in accordance with a shift in position of said members, and means for retaining the pivotal connections in any of the different positions after adjustment thereof has been effected.

14. In a power attachment for lawn mowers, an engine frame, means for mounting said engine frame on the frame of a lawn mower whereby the lawn mower may be adjusted to vary the height of the cut without tipping said engine frame, comprising pivotal connections from said engine frame to said lawn mower, one of said connections being a link pivoted to the engine frame and the mower frame above the axis of the traction wheels and the other of said connections being a link similarly pivoted an equivalent distance above the axis of the trailer roller, a cutting reel and plate on said mower frame adapted to have a point of contact therebetween changed with respect to the ground by a change in the location of the connection between the frame and the link adjacent the trailer whereby a parallelogram action results maintaining the engine frame in a new position parallel to an initial position, and means for retaining the pivotal connections in their new position after adjustment thereof has been effected, said means including a clamp bolt at one of the pivotal connections and an extension member having an arcuate slot and a clamp bolt associated therewith at the other pivotal connection.

15. In a power attachment for lawn mowers, an engine frame, and means for mounting said engine frame on the frame of a lawn mower whereby the lawn mower may be adjusted to vary the height of the cut without tipping said mounting comprising sets of links pivotally connected to said engine frame and to said lawn mower, one at a point above the axis of the traction wheels and the other at a point an equivalent distance above the axis of the trailer roller, a cutting blade and a cutting wheel in contact therewith at the cutting edge carried by said frame, and means for raising and lowering the cutting edge comprising a variable connection between one of the sets of links and the mower frame adapted to raise and lower the mower frame and the cutting edge with relation to said engine frame without changing the horizontal position of said engine frame.

ALLYN R. COOPER.